United States Patent
Benson

(10) Patent No.: US 9,912,133 B1
(45) Date of Patent: Mar. 6, 2018

(54) HOUSING WITH WALL LOCATOR MEMBERS SUITABLE FOR ELECTRICAL DEVICES SUCH AS LOADCENTERS

(71) Applicant: Eaton Corporation, Cleveland, OH (US)

(72) Inventor: Tony Ray Benson, Monticello, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/467,895

(22) Filed: Mar. 23, 2017

(51) Int. Cl.
*H02G 3/12* (2006.01)
*H01R 25/16* (2006.01)
*H02G 3/08* (2006.01)

(52) U.S. Cl.
CPC .............. *H02G 3/12* (2013.01); *H01R 25/16* (2013.01); *H02G 3/081* (2013.01)

(58) Field of Classification Search
CPC ........... H02G 3/12; H02G 3/081; H01R 25/16
USPC ........................................................ 174/502
See application file for complete search history.

(56) References Cited

U.S. PATENT DOCUMENTS

| | | | | |
|---|---|---|---|---|
| 3,746,777 A | * | 7/1973 | Peek ..................... | H01R 4/186 174/71 R |
| 7,378,590 B1 | * | 5/2008 | Herth ..................... | H02G 3/12 174/50 |
| 2016/0329669 A1 | * | 11/2016 | Hestrin ................. | H01R 13/73 |

* cited by examiner

*Primary Examiner* — Dhirubhai R Patel
(74) *Attorney, Agent, or Firm* — Myers Bigel, P.A.

(57) ABSTRACT

In-wall mountable housings include a back, top, bottom and laterally opposing first and second sidewalls that form an interior compartment. The sidewalls, top and bottom terminate at a front of the housing. The housing also includes first and second tabs attached to each of the first and second sidewalls. The first and the second tabs have one side that is integrally attached to the first or second sidewalls and three sides that are detached or detachable therefrom so that the first and second tabs can pivot outward to be perpendicular to the sidewalls. When not used, the tabs are flush with the sidewalls or angle inward into the housing. The first tab pivots outward to be spaced apart a first defined distance from the front of the housing and the second tab pivots outward to be spaced apart a second defined distance from the front of the housing.

20 Claims, 7 Drawing Sheets

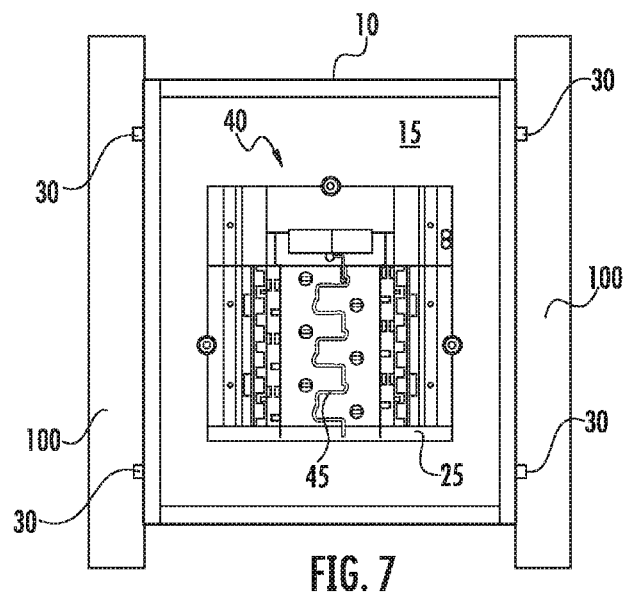
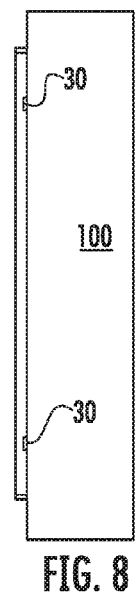
FIG. 7
FIG. 8
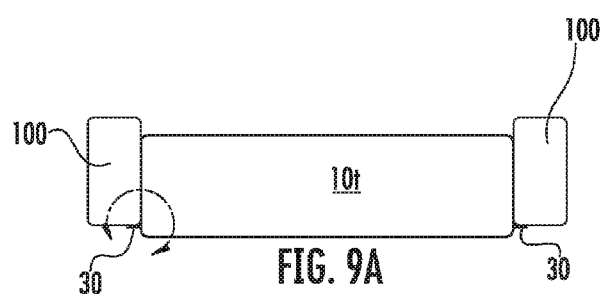
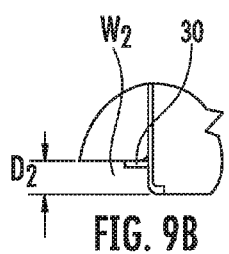
FIG. 9A
FIG. 9B

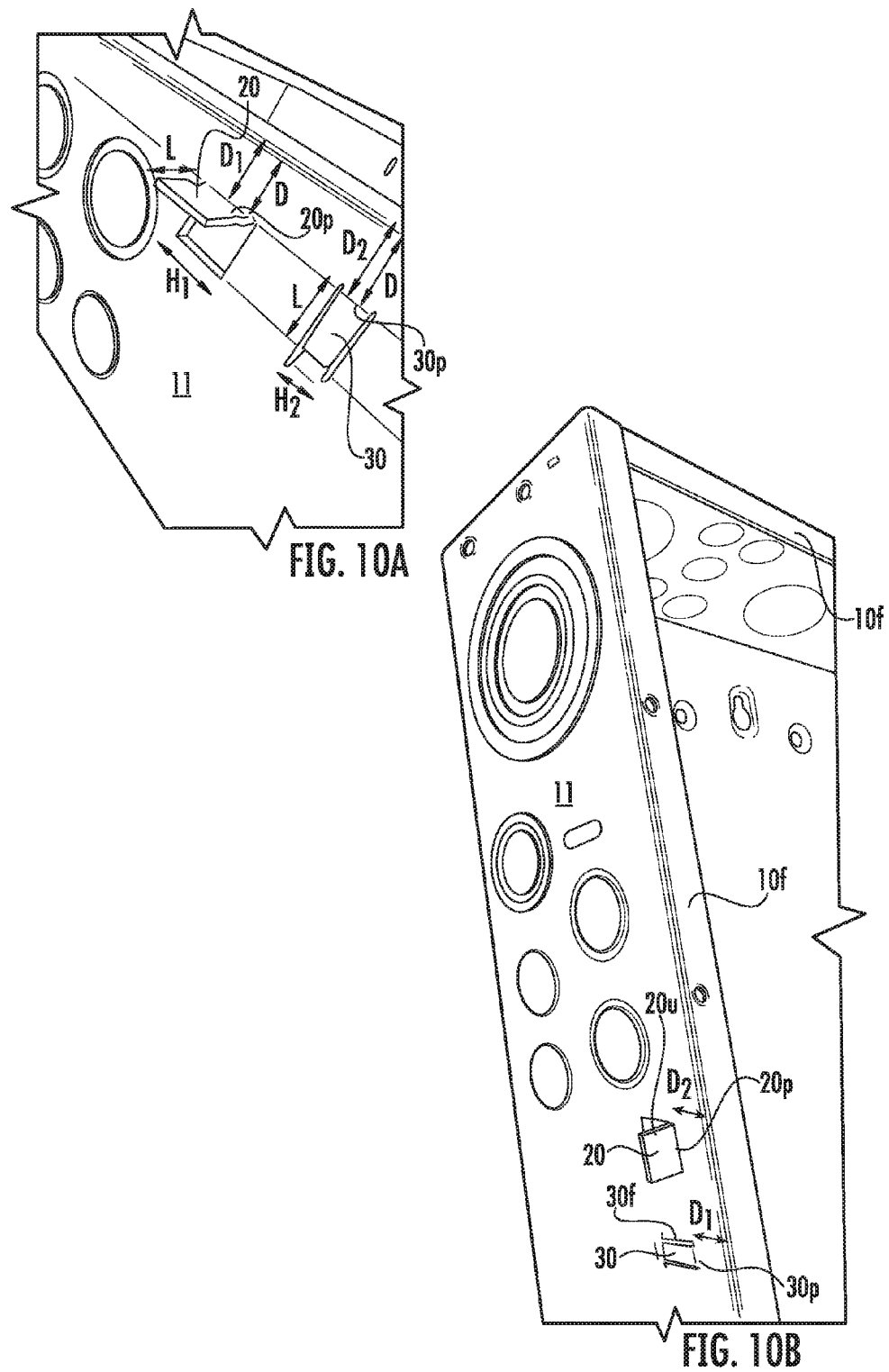

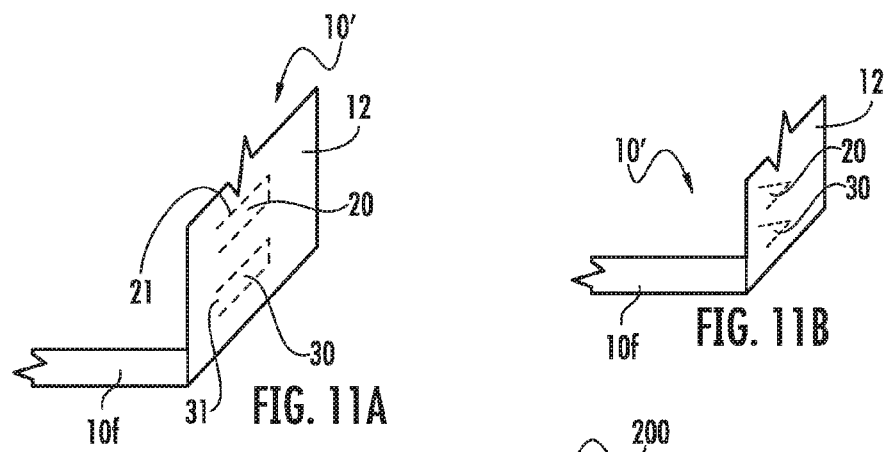
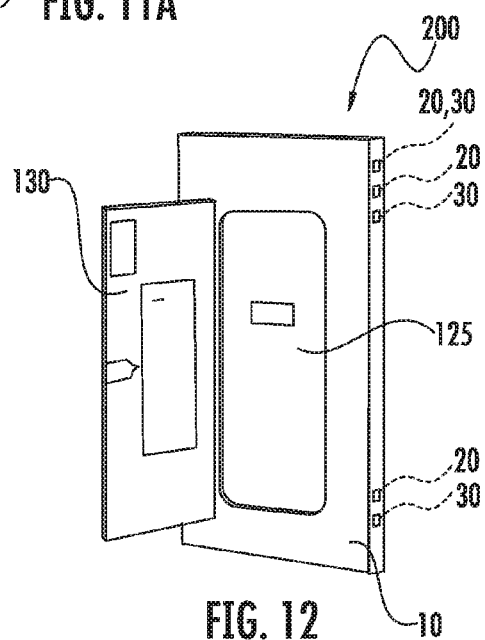
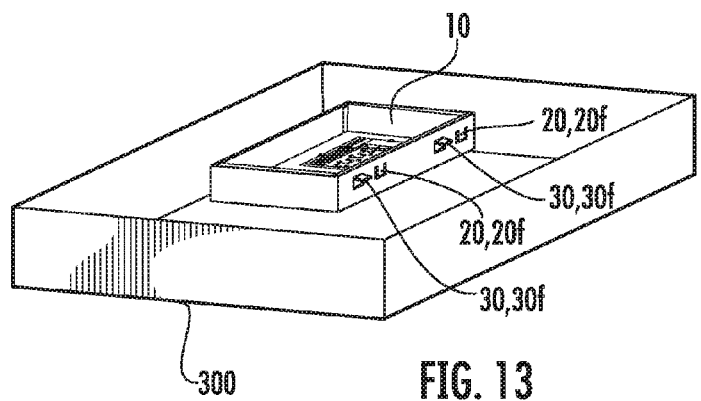

HOUSING WITH WALL LOCATOR MEMBERS SUITABLE FOR ELECTRICAL DEVICES SUCH AS LOADCENTERS

FIELD OF THE INVENTION

The present disclosure relates to cases with wall locator members which may be particularly suitable for housings for electrical devices such as distribution load centers.

BACKGROUND OF THE INVENTION

Electrical loadcenters are well known. Electrical loadcenters include electrical busses that comprise conductors permitting electrical current to be carried throughout the electrical load center. Electrical busses may contain features permitting attachment of fuses, relays, switches, wires, breakers, and other electrical elements. Loadcenters may contain one or more electrical busses in close proximity to one another, and insulating material or insulation may be used to avoid an arcing or shorting event occurring between the busses. Busses are electrically insulated from each other to avoid a phase-to-phase short circuit. Busses are also electrically insulated from the electrical loadcenter enclosure to avoid a phase-to-ground short circuit. Some loadcenters also include branch circuit breakers connected to the electrical busses at specific points within the load centers. The location, orientation, and spacing of the bus elements and insulation elements within the load are arranged so as to prevent an arcing, overcurrent, or short circuit event once the busses are placed under load.

As shown in FIG. 1A and FIG. 1B, conventional (residential) loadcenters use a "scribed" line "L" on the sides of the enclosure for an installer to use to visually align or locate the box to be flush with an outside wall surface for different wall thicknesses.

SUMMARY OF EMBODIMENTS OF THE INVENTION

Embodiments of the invention provide an in-wall mountable housing that includes a back, top, bottom and laterally opposing first and second sidewalls that form an interior compartment. The sidewalls, top and bottom terminate at a front of the housing. The housing also includes first and second tabs attached to each of the first and second sidewalls. The first and the second tabs have one side that is integrally attached to the first or second sidewalls and other sides that are detached or detachable therefrom so that the first and second tabs can pivot outward to be perpendicular to the sidewalls. When not used, the tabs are flush with the sidewalls or angle inward into the housing. The first tab pivots outward to be spaced apart a first defined distance from the front of the housing and the second tab pivots outward to be spaced apart a second defined distance from the front of the housing. The first distance is different than the second distance.

The first distance can be 0.50 inches and the second distance can be 0.625 inches.

The first and second tabs can be positioned in adjacent pairs at a top and at a bottom portion of the first and second sidewalls.

The housing can be provided in a package with the first and second tabs in an orientation that is flush with the sidewalls. The first and second tabs can be selectively bent outward by an installer to create a stop to allow an installer to flush mount the housing with an outer wall surface of different wall thickness.

The first and second tabs can have a different length or the same length.

The length can be between 0.25 inches and 0.5 inches.

The first and second tabs can have a different height.

The first and second tabs can be rectangular.

The first and second tabs can have a perimeter with one or more sides scored for facilitating detachment of those one or more sides from adjacent sidewalls.

The housing can be metallic and the tabs can have a length between 0.25 inches and 0.5 inches.

Other embodiments are directed to loadcenters. The loadcenters include an enclosure having an interior compartment. The enclosure has an in-wall mountable housing having a back, top, bottom and laterally opposing first and second sidewalls that form an interior compartment. The sidewalls, top and bottom terminate at a front of the housing. The loadcenters also include a backpan in the interior compartment and a busbar assembly in the interior compartment attached to the backpan. The loadcenters also include first and second tabs attached to each of the first and second sidewalls. The first and the second tabs have one side that is integrally attached to the first or second sidewalls and other sides that are detached or detachable therefrom so that the first and second tabs can pivot outward to be perpendicular to the sidewalls. When not used, the tabs are flush with a respective sidewall or angles inward into the housing. The first tab pivots outward to be spaced apart a first defined distance from the front of the housing and the second tab pivots outward to be spaced apart a second defined distance from the front of the housing, and wherein the first distance is different than the second distance.

The first distance is 0.50 inches and the second distance is 0.625 inches.

The first and second tabs can be positioned in adjacent pairs at at least a top and at a bottom portion of the first and second sidewalls.

The housing can be provided in a package with the first and second tabs in an orientation that is flush with the sidewalls. The first and second tabs can be selectively bent outward by an installer to create a stop to allow an installer to flush mount the housing with an outer wall surface.

The first and second tabs can have a different length and the length can be between 0.25 inches and 0.5 inches.

The first and second tabs can have the same or a different height.

The first and second tabs can be rectangular.

The first and second tabs can have a perimeter with one or more (i.e., two or three) sides scored for facilitating detachment of those one or more sides from adjacent sidewalls.

The housing can be metallic and the tabs can have a length between 0.25 inches and 0.5 inches.

Yet other embodiments are directed to methods of installing an enclosure of a load center. The methods include: (a) providing an enclosure with a plurality of first tabs and a plurality of second tabs, each on right and left sidewalls, the first tabs having an attached pivot joint side that is positioned a first distance from a front of the enclosure and the second tabs having an attached pivot joint side positioned a second and different distance from the front of the enclosure; (b) selectively pivoting either the first tabs or the second tabs outward from the sidewalls to form a locator stop for an installation; and (c) placing the pivoted outward tabs against outwardly facing forward surfaces of studs of a wall to place a front of the enclosure a distance forward thereof at a defined distance associated with a wall thickness.

The providing step can include providing a package with the enclosure with the first and second tabs in a flush orientation with the sidewalls.

The tabs can be provided in an orientation that is flush with the sidewalls but can be selectively bent outward by an installer to create a stop to allow an installer to flush mount the housing with an outer wall surface.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 7 is a front view of the housing shown in FIG. 2, shown mounted to studs to be flush with a wall at a second wall thickness according to embodiments of the present invention.

FIG. 8 is side view of the housing and studs shown in FIG. 7.

FIG. 9A is a top view of the housing and studs shown in FIG. 7 and FIG. 8.

FIG. 9B is an enlarged top view of a front corner of the housing and studs shown in FIG. 9A.

FIG. 10A and FIG. 10B are side partial perspective views of sidewalls of a housing according to embodiments of the present invention.

FIG. 11A is a partial schematic view of a housing illustrating alternative tab configurations according to embodiments of the present invention.

FIG. 11B is a partial schematic view of a housing illustrating alternative tab configurations according to embodiments of the present invention.

FIG. 12 is a front perspective view of a loadcenter according to embodiments of the present invention.

FIG. 13 is a schematic illustration of a package holding an enclosure with tabs according to embodiments of the present invention.

DETAILED DESCRIPTION OF EMBODIMENTS OF THE INVENTION

Figure 1A:
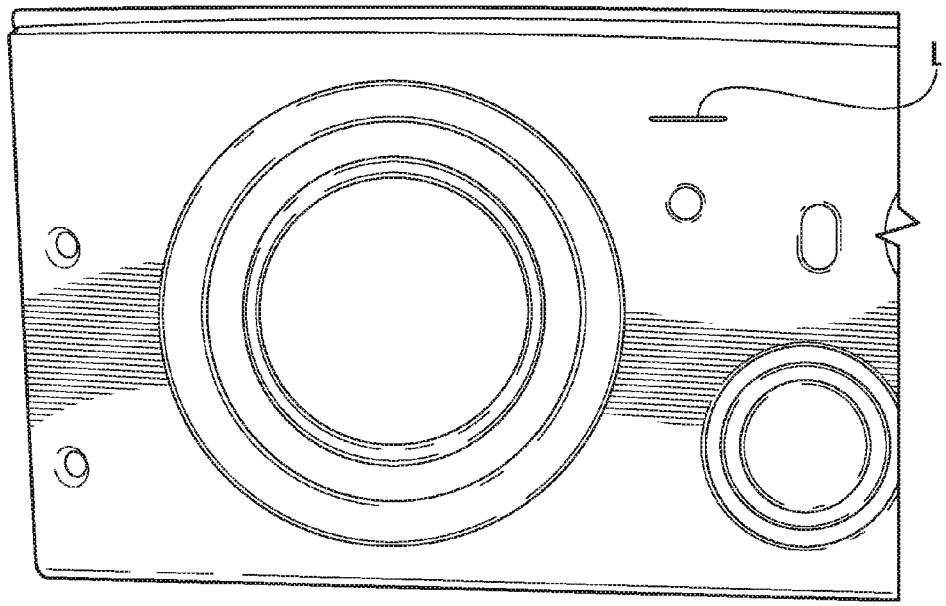
FIG. 1A and FIG. 1B are sidewalls of conventional residential load centers.
Figure 1B:
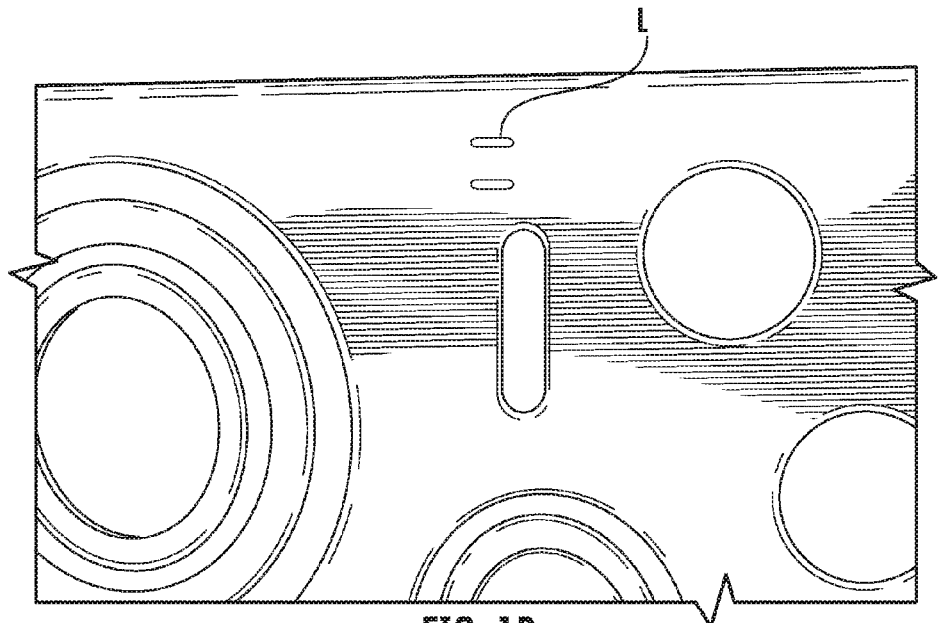

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). The terms "Fig." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical devices such as load centers. The terms "load center" and "electrical distribution load center" refer to the collective components of an electrical distribution system and its respective housing that supplies electrical power to one or more subsidiary circuits. The terms "bus," "bus element," "electrical distribution bus," or "bus bar" refers to components in an electrical distribution system that conducts electricity within the load center. However, the housings may also be useful for other in-wall mountable housings.

Figure 2:
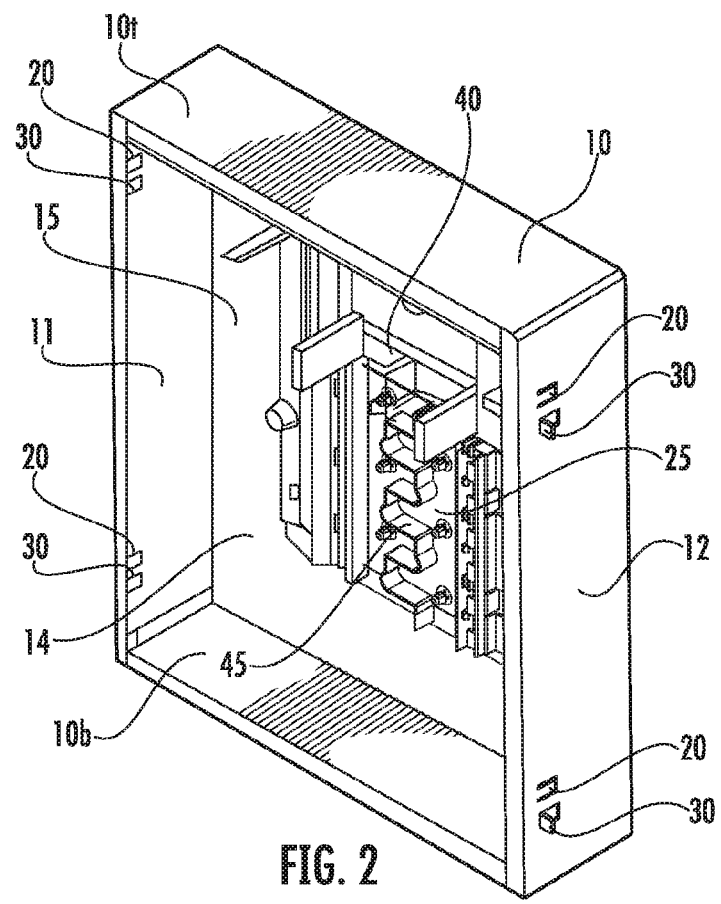
FIG. 2 is a top, side perspective view of a housing with a back pan assembly for a load center according to embodiments of the present invention.

Referring now to FIG. 2, an exemplary housing 10 is shown. The housing 10 (also described as an "enclosure") has an interior compartment 15. As shown, the housing 10 holds a back pan 25 and an interior assembly 40 with a bus 45 having one or more bus bars. The interior assembly 40 can be either detachably or permanently fastened to the back pan 25. The interior assembly 40 (also sometimes just referred to as "the interior") can refer to the internal components of a load center including the insulating barrier, i.e., sheet, film or layer (which can optionally comprise mylar), the bus 45, the retaining clips (the hook part) and the stabs (the bent-up parts) and the like. Prior to, during or post installation of the housing 10, the interior assembly 40 can include or be connected to a main breaker. The breaker may be connected to an external power supply via collars or lugs that connect cables/power cords (not shown).

Figure 3:
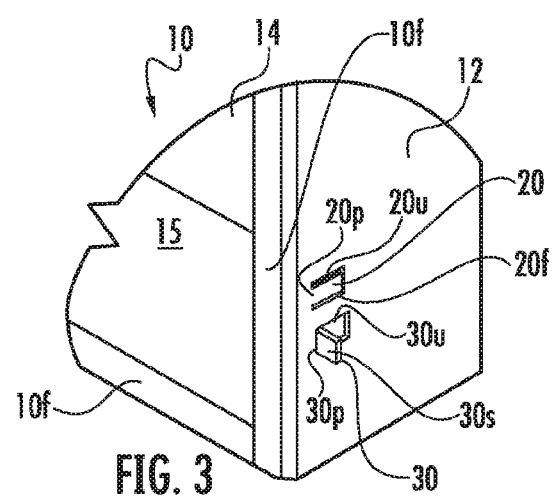
FIG. 3 is an enlarged partial perspective view of the housing shown in FIG. 2 according to embodiments of the present invention.
Figure 4:
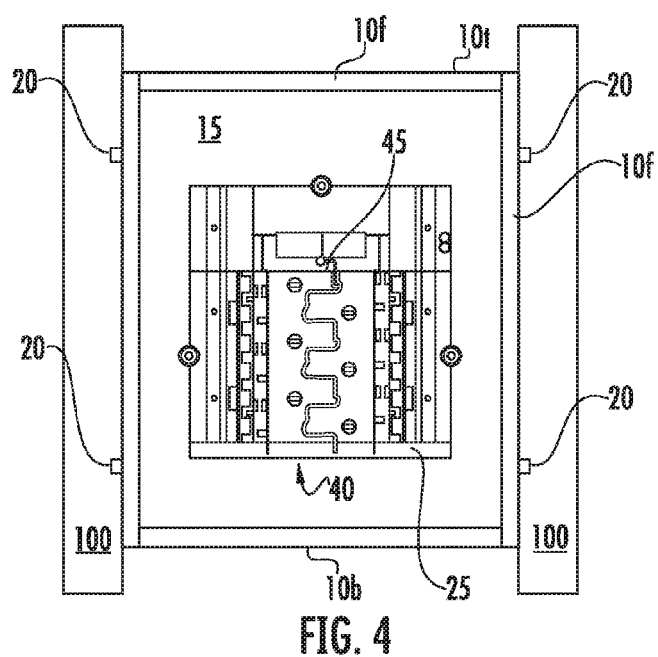
FIG. 4 is a front view of the housing shown in FIG. 2, shown mounted to studs to be flush with a wall at a first wall thickness according to embodiments of the present invention.

Referring to FIG. 2 and FIG. 3, the housing 10 has a pair of laterally spaced apart sidewalls 11, 12 that extend from a back wall 14 of the housing. The housing 10 has a top 10$t$, a bottom 10$b$, and a front 10$f$. The front 10$f$ faces outward and can have a square or rectangular perimeter. The front 10$f$ can have short surfaces that can have a length that is between 0.1 inches and 1 inch. The short surfaces can form edges that are perpendicular to, typically extensions of, the sidewalls 11, 12 the top 10$t$ and the bottom 10$b$ of the housing 10. Each sidewall 11, 12 can include longitudinally spaced apart sets of first and second tabs 20, 30, shown as a pair at a top portion and a pair at a bottom portion of each sidewall 11, 12.

The first tab 20 is configured to pivot outward from an attached pivot joint 20$p$ to provide a locator stop for a first wall thickness and the second tab 30 is configured to pivot outward from an attached pivot joint 30$p$ from the sidewall 11, 12 to provide a locator stop for a second wall thickness that is different from the first wall thickness (typically set by a drywall or sheetrock thickness with or without another wall covering such as brick, paneling, tile and the like).

As shown, the tabs 20, 30 are cantilevered members that are integral to the sidewalls 11, 12, with the attached side 20$p$, 30$p$ being closest to the front of the housing 10$f$. The tabs 20, 30 can be monolithic features of the sidewalls 11, 12 and can be cutouts to have the three detachable sides connected across only the pivoting side 20$p$, 30$p$.

The tabs 20, 30 can be relatively small (i.e., mini-locator tabs) and have a height dimension that is less than 10% of the height of the sidewall 11, 12, typically between 0.01% and under 10.0% of a height dimension of the sidewall, and more typically between 0.01% and 0.1% or 0.1% and 0.5%. The width dimension (identified as a direction extending toward the back of the enclosure a length when flush with the sidewall) of the tabs 20, 30 can be less than 20% of the width dimension of the sidewall 11, 12, typically between 1% and 20%, such as about 1%, about 5%, or about 10%, or about 20% in some embodiments.

Referring to FIG. 11A, the tabs 20, 30 can have one or more sides of a perimeter that can be scored 21, 31 or otherwise formed so that there is a thinner wall thickness and/or a discontinuous attachment region (perforations for example) about one or more sides of the perimeters relative to the wall thickness on the attached side 20$p$, 30$p$ and/or the wall thickness of the sidewalls 11,12 so that the tabs 20, 30 are attached but easily detachable along one or more sides (shown as three sides) by an installer such as by use of a tool or manual force to separate three sides of tabs of interest.

FIG. 3 shows the second tab 30 pivoted outward to be perpendicular to the sidewall 12 for a use orientation 30$s$ and with the adjacent first tab 20 flush with the sidewall 12 in a non-use orientation 20$f$.

More than two sets of tabs 20, 30 on each sidewall 11, 12 may be used. Different numbers of tabs 20, 30 can be used on each sidewall 11, 12.

The tabs 20, 30 are shown as rectangular but other shapes may be used. FIGS. 10A and 10B show tab 20 with a height dimension $H_1$ about the same or greater than the length dimension L and tab 30 with a length dimension L greater than a height dimension $H_2$.

Referring to FIGS. 3 and 10B, the first and second tabs 20, 30 can be adjacently positioned so that upper surfaces 20$u$, 30$u$ of neighboring pairs are within about 2 inches of each other. In other embodiments, the neighboring tabs 20, 30 can be longitudinally spaced apart from each other a further distance, typically between 3-6 inches.

The tabs 20, 30 can have the same or different lengths L (FIG. 10A). The tabs 20, 30 can have the same or different heights ($H_1$, $H_2$, FIG. 10A). The tabs 20, 30 can have any suitable shape and are not required to have a rectangular shape. For example, as shown in FIG. 11B, one or more tabs 30 can have a triangular shape with a pointed or rounded free end. Circular or other geometric shapes may be used.

The tabs 20, 30 may have lengths between about 0.10 inches and 0.50 inches, more typically between 0.25 inches and 0.5 inches.

FIGS. 4-6B show the housing 10 mounted to studs 100 (which may optionally be 2×4 studs) using locator tabs 20 to place the front of the housing 10$f$ flush with a wall of a first defined target wall thickness $W_1$, shown as $D_1$, which can be 0.50 inches.

Figure 5:
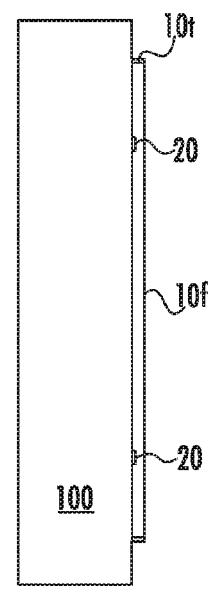
FIG. 5 is side view of the housing and studs shown in FIG. 4.
Figure 6A:
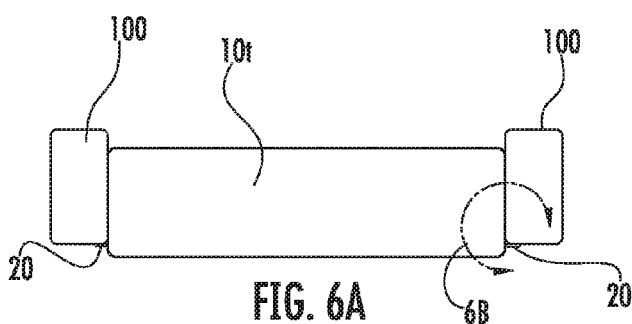
FIG. 6A is a top view of the housing and studs shown in FIG. 4 and FIG. 5.
Figure 6B:
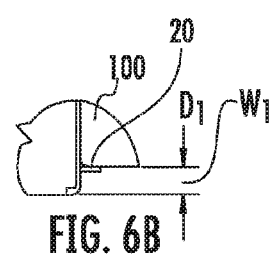
FIG. 6B is an enlarged top view of a front corner of the housing and studs shown in FIG. 6A.

FIGS. 7-9B show the housing 10 mounted to studs 100 using locator tabs 30 to place the front of the housing 10$f$ flush with a wall of a second defined target wall thickness $W_2$, shown as $D_2$, which can be 0.625 inches. Thus, as shown in FIG. 8, the housing projects forward a greater distance from the studs 100 using locator tabs 30 relative to the housing 10 using locator tabs 20 (FIG. 5).

Referring to FIG. 10A and FIG. 10B, the tabs 20, 30 can be configured so that the tab, i.e., tab 20, providing a locator stop for the greater wall thickness $W_2$, can have a greater height dimension $H_1$ than the height dimension $H_2$ of the other tab, i.e., tab 30. The tabs 20, 30 can have the attached, pivoting side 20p, 30p placed relative to the front 10f of the housing so that the tab providing the spacing for the flush mount for a greater wall thickness $W_2$ is positioned a further distance D from the front of the housing 10f. For example, if tab 20 provides the 0.50 inch spacing, then the distance from its attached pivoting side 20p has a distance $D_1$ is less than the distance $D_2$ of the pivot side 30p of tab 30.

The tabs 20, 30 can be packaged and ready to use with all tabs 20, 30 flush with the sidewalls 11, 12 or even pivoted inward. The tabs 20, 30 can be packaged and ready to use with one or both pre-bent outward and an installer can bend back inward the one that is not appropriate for a particular installation or change the one that is pivoted outward as appropriate for a particular installation.

FIG. 12 shows the housing 10 attached to a door 130 and front panel 125 of a loadcenter 200, which can be a residential or industrial loadcenter.

FIG. 13 shows the housing 10 in a package 300 such as a box for shipment and installer with a ready to use configuration having the tabs 20, 30 in the flush orientation 201, 30f so that a user can select the appropriate tabs for use at an installation site, for example.

The loadcenter 200 can hold a main circuit breaker that can have any suitable configuration. While not conventional, the main circuit breaker can optionally be an Arc Fault Circuit Interrupter (AFCI) and/or Ground Fault Circuit Interrupter (GFCI) which are among a variety of overcurrent protection devices used for circuit protection and isolation. AFCIs reduce fire hazards in electrical circuits by reducing the effects of high current arcing faults as well as detecting persistent low-current arcing faults. GFCIs reduce the potential of electrical shock. Both branch feeder and combination AFCIs provide conventional thermal and magnetic overcurrent protection. Both can also provide high current or "parallel" arcing fault detection and fire mitigation for installed wiring and connected cords. National Electrical Code (NEC) revisions have increased the requirement for sections of the home that require Arc Fault or Ground Fault protection. Optionally, the circuit breaker can be a Type BR or CH AFCI or GFCI breaker.

Figure 14:
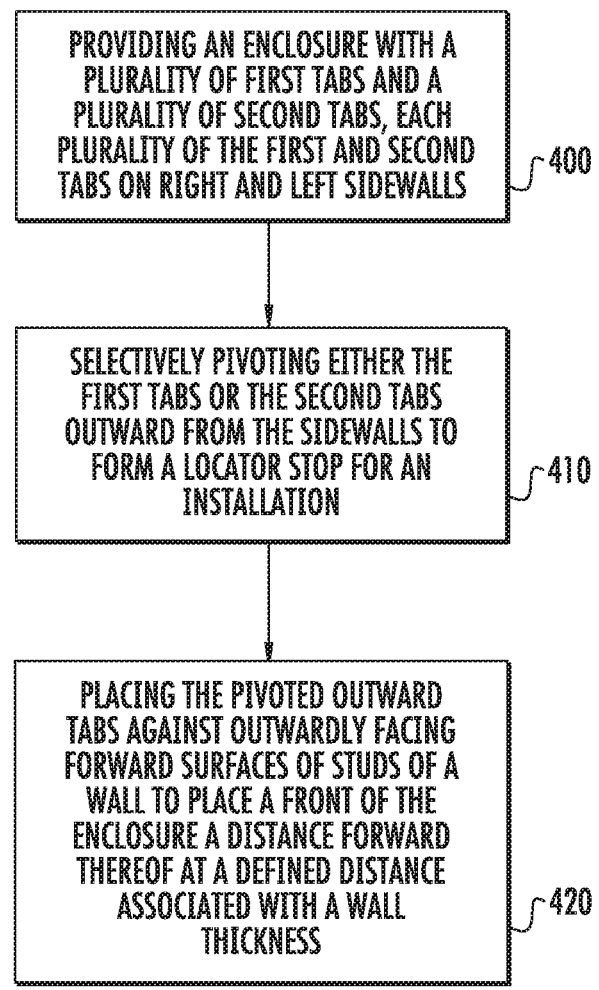
FIG. 14 is a flow chart of exemplary operations that can be carried out for installing a loadcenter enclosure according to embodiments of the present invention.

FIG. 14 is a flow chart of actions that can be carried out to install a loadcenter enclosure. An enclosure is provided with a plurality of first tabs and a plurality of second tabs, each on right and left sidewalls (block 400). The first tabs have an attached pivot joint side that is positioned a first distance from a front of the enclosure and the second tabs having an attached pivot joint side that is positioned a second and different distance from the front of the enclosure. Either the first tabs or the second tabs are selectively pivoted outward from the sidewalls to form a locator stop for an installation (block 410). The pivoted outward tabs are placed against outwardly facing forward surfaces of studs of a wall to place a front of the enclosure a distance forward thereof at a defined distance associated with a drywall or other wall thickness (block 420).

The providing step can include providing a package with the enclosure with the first and second tabs in a flush orientation with the sidewalls.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An in-wall mountable housing, comprising:
   an in-wall mountable housing having a back, top, bottom and laterally opposing first and second sidewalls that form an interior compartment, wherein the first and second sidewalls, top and bottom terminate at a front of the housing; and
   first and second tabs attached to each of the first and second sidewalls, wherein the first and the second tabs each have one side that is integrally attached to the first or second sidewall and other sides that are detached or detachable therefrom, wherein the one side that is integrally attached comprises a pivot joint to allow the first and second tabs to pivot outward to be perpendicular to the first and second sidewalls and, when not used, are flush with a corresponding one of the first and second sidewalls or angle inward into the housing, wherein the first tab pivots outward to be spaced apart a first defined distance from the front of the housing and the second tab pivots outward to be spaced apart a second defined distance from the front of the housing, and wherein the first defined distance is different than the second defined distance to thereby provide different locator stop positions from a first wall thickness of a mounting wall to a second different wall thickness of the mounting wall.

2. The housing of claim 1, wherein the first defined distance is 0.50 inches and the second defined distance is 0.625 inches.

3. The housing of claim 1, wherein the first and second tabs are positioned in adjacent pairs at a top and at a bottom portion of the first and second sidewalls.

4. The housing of claim 1, wherein the housing is provided in a package with the first and second tabs in an orientation that is flush with the sidewalls, and wherein the first and second tabs can be selectively bent outward by an installer to create a stop to allow an installer to flush mount the housing with an outer wall surface of different drywall thickness.

5. The housing of claim 1, wherein the first and second tabs have a length that is different from each other, and wherein the length is between 0.25 inches and 0.5 inches.

6. The housing of claim 1, wherein the first and second tabs have a different height.

7. The housing of claim 1, wherein the first and second tabs are rectangular.

8. The housing of claim 1, wherein the first and second tabs have a perimeter with one or more sides scored for facilitating detachment of the one or more sides from adjacent sidewalls.

9. The housing of claim 1, wherein the housing is metallic, wherein the first and second tabs have a length between 0.25 inches and 0.5 inches, and wherein, when not used, the first and second tabs are flush with the corresponding one of the first and second sidewalls.

10. A method of installing an enclosure of a load center, comprising:
    providing the in-wall mountable housing of claim 1;

selectively pivoting either the first tabs or the second tabs outward from the sidewalls to form a locator stop for an installation; and placing the pivoted outward tabs against outwardly facing forward surfaces of studs of a wall to place a front of the enclosure a distance forward thereof at a defined distance associated with a wall thickness.

11. The method of claim 10, wherein the providing step comprises providing a package with the enclosure with the first and second tabs in a flush orientation with the sidewalls.

12. A load center comprising:
an enclosure having an interior compartment, wherein the enclosure has an in-wall mountable housing having a back, top, bottom and laterally opposing first and second sidewalls that form an interior compartment, wherein the first and second sidewalls, top and bottom terminate at a front of the housing;
a backpan in the interior compartment;
a bus bar assembly in the interior compartment attached to the backpan; and
first and second tabs attached to each of the first and second sidewalls, wherein the first and the second tabs each have one side that is integrally attached to the first sidewall or the second sidewall and other sides that are detached or detachable therefrom, wherein the one side that is integrally attached comprises a pivot joint to allow the first and second tabs to pivot outward to be perpendicular to the first and second sidewalls and, when not used, be flush with the first or second sidewall or angle inward into the housing, wherein the first tab pivots outward to be spaced apart a first defined distance from the front of the housing and the second tab pivots outward to be spaced apart a second defined distance from the front of the housing, and wherein the first defined distance is different than the second defined distance to thereby provide different locator stop positions from a first wall thickness of a mounting wall to a second different wall thickness of the mounting wall.

13. The load center of claim 12, wherein the first defined distance is 0.50 inches and the second defined distance is 0.625 inches.

14. The load center of claim 12, wherein the first and second tabs are positioned in adjacent pairs at least at a top and at a bottom portion of the first and second sidewalls.

15. The load center of claim 12, wherein the housing is provided in a package with the first and second tabs in an orientation that is flush with the sidewalls, and wherein the first and second tabs can be selectively bent outward by an installer to create a stop to allow an installer to flush mount the housing with an outer wall surface of a wall to which the load center is mounted.

16. The load center of claim 12, wherein the first and second tabs have a length that is different from each other, and wherein the length is between 0.25 inches and 0.5 inches.

17. The load center of claim 12, wherein the first and second tabs have a different height.

18. The load center of claim 12, wherein the first and second tabs are rectangular.

19. The load center of claim 12, wherein the first and second tabs have a perimeter with one or more sides scored for facilitating detachment of those one or more sides from adjacent sidewalls.

20. The load center of claim 12, wherein the housing is metallic and the first and second tabs have a length between 0.25 inches and 0.5 inches, and wherein, when not used, the first and second tabs are flush with the first or second sidewall.

* * * * *

UNITED STATES PATENT AND TRADEMARK OFFICE
CERTIFICATE OF CORRECTION

PATENT NO. : 9,912,133 B1
APPLICATION NO. : 15/467895
DATED : March 6, 2018
INVENTOR(S) : Tony Ray Benson Page 1 of 1

It is certified that error appears in the above-identified patent and that said Letters Patent is hereby corrected as shown below:

In the Specification

Column 7, Line 23: Please correct "201" to read -- 20$f$ --

Signed and Sealed this
Fifth Day of June, 2018

Andrei Iancu
*Director of the United States Patent and Trademark Office*